United States Patent
Ramaiah Nanjundaiah et al.

(10) Patent No.: US 9,501,298 B2
(45) Date of Patent: Nov. 22, 2016

(54) REMOTELY EXECUTING OPERATIONS OF AN APPLICATION USING A SCHEMA THAT PROVIDES FOR EXECUTABLE SCRIPTS IN A NODAL HIERARCHY

(71) Applicant: HEWLETT-PACKARD DEVELOPMENT COMPANY, L.P., Houston, TX (US)

(72) Inventors: Vishwanath Ramaiah Nanjundaiah, Bangalore (IN); Sundharam Balathirupurasundari, Bangalore (IN); Ritesh Ranjan Jha, Bangalore (IN); James Allely Rowson, Fremont, CA (US); Venugopal Kumarahalli Srinivasmurthy, Bangalore (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/764,131

(22) PCT Filed: Jan. 31, 2013

(86) PCT No.: PCT/US2013/024230
§ 371 (c)(1),
(2) Date: Jul. 28, 2015

(87) PCT Pub. No.: WO2014/120227
PCT Pub. Date: Aug. 7, 2014

(65) Prior Publication Data
US 2015/0370577 A1    Dec. 24, 2015

(51) Int. Cl.
G06F 9/44       (2006.01)
G06F 9/445      (2006.01)
G06F 17/30      (2006.01)
G06F 9/06       (2006.01)

(52) U.S. Cl.
CPC .............. *G06F 9/445* (2013.01); *G06F 9/06* (2013.01); *G06F 9/44* (2013.01); *G06F 17/30* (2013.01)

(58) Field of Classification Search
None
See application file for complete search history.

(56) References Cited

U.S. PATENT DOCUMENTS

| | | |
|---|---|---|
| 6,907,395 B1 | 6/2005 | Hunt et al. |
| 7,490,316 B2 | 2/2009 | Chan et al. |
| 7,630,877 B2 | 12/2009 | Brown et al. |

(Continued)

OTHER PUBLICATIONS

Helen Kosova, "TestComplete Script Extensions: StringUtils Object," SmartBear Software, Oct. 8, 2008, pp. 1-5. Available at: <blog.smartbear.com/software-quality/bid/170167/TestComplete-Script-Extensions-StringUtils-Object>.

(Continued)

*Primary Examiner* — Benjamin Wu
(74) *Attorney, Agent, or Firm* — HP Inc Patent Department

(57) ABSTRACT

A schema is provided that logically represents a nodal hierarchy relating to execution of an application. The hierarchy includes multiple nodes, including one or more category nodes and one or more content nodes. An executable script is provided with the schema. The script may be associated with at least one node of the hierarchy. Each of multiple user inputs from the computing device are processed using the schema. The individual user inputs may be selective of nodes of the hierarchy. In response to processing each of multiple user inputs, user interface content is provided to the computing device. The user interface content for each user input corresponds to one of (i) one or more nodes, or (ii) a script content, generated as an output of an executed script that is associated with a selected node.

15 Claims, 4 Drawing Sheets

(56) References Cited

U.S. PATENT DOCUMENTS

| | | | | |
|---|---|---|---|---|
| 8,341,732 B2* | 12/2012 | Croft | ............... | G06F 3/1415 |
| | | | | 713/164 |
| 8,375,429 B2* | 2/2013 | Mondal | ............... | H04L 67/34 |
| | | | | 726/2 |
| 8,688,820 B1* | 4/2014 | Bhogi | ............... | G06F 9/542 |
| | | | | 709/217 |
| 8,875,102 B1* | 10/2014 | Feng | ............... | G06F 9/45529 |
| | | | | 717/124 |
| 8,885,192 B2* | 11/2014 | Rowson | ............... | 358/1.15 |
| 9,342,301 B2* | 5/2016 | Koutrika | ............... | G06F 8/36 |
| 2002/0059325 A1* | 5/2002 | Beizer | ............... | G06F 17/30008 |
| 2004/0078373 A1* | 4/2004 | Ghoneimy | ............... | G06Q 99/00 |
| 2005/0273496 A1* | 12/2005 | Jean | ............... | H04L 12/581 |
| | | | | 709/206 |
| 2008/0222160 A1* | 9/2008 | MacDonald | ............... | G06F 8/61 |
| 2010/0095272 A1 | 4/2010 | Shukla et al. | | |
| 2011/0078705 A1 | 3/2011 | MacLinovsky et al. | | |
| 2012/0143866 A1 | 6/2012 | Mameri et al. | | |
| 2012/0198457 A1 | 8/2012 | Leonelli et al. | | |
| 2012/0291006 A1 | 11/2012 | Quine | | |
| 2013/0104100 A1* | 4/2013 | Mueller | ............... | G06F 9/44 |
| | | | | 717/106 |
| 2013/0271783 A1* | 10/2013 | Ganesan | ............... | G06F 3/1204 |
| | | | | 358/1.15 |
| 2014/0208294 A1* | 7/2014 | Randhir | ............... | G06F 9/45512 |
| | | | | 717/115 |
| 2014/0368880 A1* | 12/2014 | Venugopal | ............... | G06F 8/38 |
| | | | | 358/1.15 |

OTHER PUBLICATIONS

International Searching Authority, International Search Report and Written Opinion, Sep. 5, 2013, 10 pages.

PowerBuilder, Sybase Inc.—v 7.6, Jan. 1, 2013, 1 page, Available at: sybase.in/products/modelingdevelopment/powerbuilder>.

Tim Kraska, "Building Database Appilcations in the Cloud," Diss, ETH No. 18832, Swiss Federal Institute of Technology, Zurich, Mar. 10, 2010, pp. 1-227, Available at: <e-collection.library.ethz.ch/eserv/eth:924/eth-924-02.pdf>.

* cited by examiner

REMOTELY EXECUTING OPERATIONS OF AN APPLICATION USING A SCHEMA THAT PROVIDES FOR EXECUTABLE SCRIPTS IN A NODAL HIERARCHY

BACKGROUND

Application software, commonly referred to as an application or simply an "app," is designed to allow a user to perform a singular or multiple related specific tasks, often leveraging Internet connectivity. Such "apps" are increasingly designed for a variety of web-connected devices, including mobile devices, desktop computers, notebooks, and printers.

DETAILED DESCRIPTION

Figure 1:
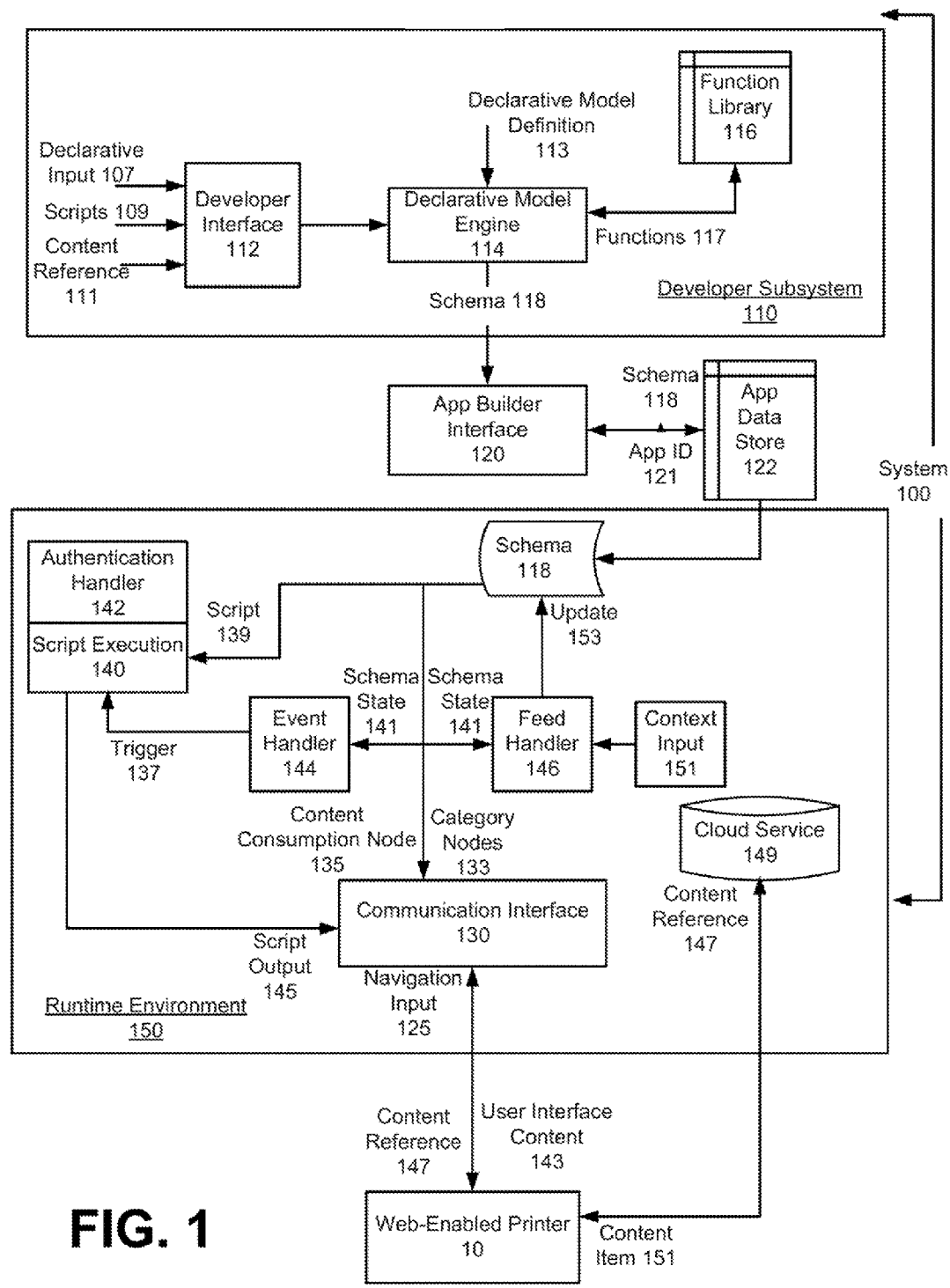
FIG. 1 illustrates an example system for remotely executing an application in use on a computing device.

Examples described herein provide for remotely executing operations of an application that is utilized by an end user on a computing device. According to some implementations, a schema is provided that logically representing a nodal hierarchy relating to execution of an application. The hierarchy includes multiple nodes, including one or more category nodes and one or more content nodes. An executable script is provided with the schema. The script may be associated with at least one node of the hierarchy. Each of multiple user inputs from the computing device are processed using the schema. The individual user inputs may be selective of nodes of the hierarchy. In response to processing each of multiple user inputs, user interface content is provided to the computing device. The user interface content for each user input corresponds to one of (i) one or more nodes, or (U) a script content, generated as an output of an executed script that is associated with a selected node.

As another example, a computer system includes a memory resource and one or more processors. The memory resource stores a set of instructions and a schema. The schema logically represents a hierarchy of nodes for an application that is operable on a computing device in communication with the computing system. The hierarchy includes multiple nodes, including one or more category nodes and one or more content consumption nodes, and at least one of the nodes of the hierarchy is associated with an executable script. The one or more processors execute the instructions from memory in order to access the schema in response to a selection input from an operator of the computer. In response to input from the operator of the computing device, a series of user interface content is provided to the computing device. Each user interface content may correspond to one of (i) one or more nodes, or (ii) a script content, generated as an output of an executed script that is associated with a selected node.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates an example system for remotely executing operations of an application in use on a computing device. A system 100 can be implemented on, or as part of a service that communicates with end user devices on which the applications are in use. In an example of FIG. 1, the end user device is depicted as a web-enabled printer 10. In variations, other kinds of devices, such as projectors, scanners, copiers, or appliances can be used in place of the printer 10. As exemplified by web-enabled printer 10, such devices often carry minimal input features and displays. System 100 can communicate with the printer 10 in a manner that enables a user of the printer to operate an application. The operations of the application can be executed remotely on system 100, and the user interaction can correspond to viewing output, receiving user interface content, and having the printer 10 perform actions for consuming content (e.g., print a page from a content source) as specified by the application.

In more detail, the system 100 can provide a network service that enables developers to provide applications, as well as to configure and/or update applications, for use on end user devices (such as web-enabled printer 10). The applications can be remotely executed substantially through the network service provided by system 100. For example, as described in more detail, system 100 can implement programmatic operations for an application, and provide user interface content 143 to the printer 10 or (other end-user devices). Users may respond with input made through the user interface content, and the system 100 may implement the applications to respond to the user input and provide new or updated user interface content. Some actions performed by the system 100 can include controlling, or directing printer 10 to access and consume (e.g., print) content from a particular source.

In one, example, system 100 includes a developer subsystem 110. The developer subsystem can optionally be provided as a separate system or entity from system 100. In an example of FIG. 1, developer subsystem 110 includes components for enabling the developer to specify or create a declarative application, based on a nodal hierarchy that the user defines for purpose of handling input from users, and for responding to the input in a particular manner that is specific to the application. In one implementation, developer subsystem 110 includes a developer interface 112, a declarative model engine 114 and a function library 116. The schema 118 can include or define a logical nodal hierarchy that determines programmatic behavior in response to user input on the printer 10. In one implementation, schema 118 is provided as an XML feed that is communicated to runtime components of system 100. The developer interface 112 can serve to receive XML input, or alternatively, commands that can be translated into XML semantics.

The developer interface 112 can correspond to a webpage or other programmatic interface that can receive declarative inputs 107, scripts 109, and content references 111 from the developer user. A declarative model definition 113 can combine with functions 117 specified in function library 116 in order to develop semantic elements and structure of a schema 118. The scripts 109 can be written in a scripting language such as JavaScript. In one implementation, the developer user specifies the script or portions thereof. In variations, the script 109 can be generated from input fields provided by the developer, and the input fields can then be combined with semantic elements to generate the script 109. An individual script can be associated with one or more different nodes of the schema 118. The developer can specify triggers with nodes of the schema 118. The triggers can determine when the script 139 is triggered to perform a function, in connection with other operations performed through the schema 118. Still further, a script library or source file can be maintained (e.g., as part of function library 116) and include all script functions that are utilized in the schema 118.

In an, implementation in which the end user device is, for example, a printer, the schema 118 can define a nodal tree in which individual nodes correspond to content that either contains other categories (category nodes 133) or printable documents (content consumption nodes 135). The schema 118 can define the navigation possibilities of the user operating the end user device (which can have limited user input functionality). As described below, with selection of category nodes 133, the user may view user interface content to enable further navigation. With selection of content consumption nodes 135, the printer 10 may access content from a designated source (e.g., network source and perform a print operation).

System 100 can include a runtime environment 150 that includes an app builder interface 120, a communication interface 130, and one or more components for implementing script logic. The app builder interface 120 receives the schema 118 and stores the schema 118 in association with an application identifier 121 in the application data store 122. Various events can cause the runtime environment 150 to select an application from the application data store 122, and to execute the application on behalf of the end-user device. In the example shown, the schema 118 is retrieved from the application data store 122. The specific schema 118 can be selected based on the particular application that is identified by external events, such as by user selection input on the end user device (e.g., printer 10).

In one implementation, the communication interface 130 of the runtime environment 150 can implement an application by accessing the corresponding schema 118 from the application data store 122 (e.g., in response to user input). For example, the communication interface 130 receives input corresponding to navigation input 125, and uses the navigation input to navigate amongst nodes of the schema 118. With navigation of nodes of schema 118, the communication interface identifies one of (i) category nodes 133, or (ii) content consumption nodes 135. If the navigation input 125 results in the selection of a category node 133, the communication interface can, from the schema 118, display user interface content 143. If the navigation input 125 results in the selection of one of the content consumption node 135, the communication interface 130 can communicate user interface content 143 along with a content reference 147 (or command) that directs the printer 10 to consume content from a particular location. For example, content reference 147 can direct the printer 10 to a cloud service 149 where a specific context input 151 is provided, or to a local source in the file directory of the printer 10. The input can be based on the navigation state resulting from the navigation input 125 of the user.

As noted, the schema 118 can include one or more scripts 139 that execute in response to conditions, events or context. Each script 139 can include triggers that cause execution of the script in response to conditions or events (e.g., selection of a particular node by navigation input 125). In one implementation, the individual scripts 139 specified in schema 118 are processed by the script execution component 140. A script output 145 can be communicated to the communication interface 130, where it can result in further nodal navigation, user interface content 143 (e.g., display user interface corresponding to functionality provided by the script 139) and/or content reference 147. Various kinds of functions or operations can be specified as a result of the execution of the script 139. Among the functions that can be performed, the script 139 can implement or provide an authentication handler 142 for a particular resource, such as a content resource where the printer 10 accesses content from a content source. For example, a category node of the schema 118 can point to a script for providing an authentication handler 142 that handles non-standard custom authentication logic.

The script execution component 140 can be triggered to execute script 139 in response to a trigger 137. The trigger 137 can be generated by logic, such as an event handler 144, that detects a schema state 141 of the schema after the user initiates use of the corresponding application. The event handler 144 can maintain the schema state 141 as the user navigates through the nodal hierarchy of the schema 118. Specific kinds of user input can also be detected and handled by the event handler 144. Thus, user input can affect schema state 141, result in the generation of node content (associated with category nodes 133 and/or content consumption nodes 135), and/or result in execution of one or more scripts 139 through the script execution 140.

In some variations, a feed handler 146 can execute as part of the logic provided by the script 139 to update the nodal hierarchy of the schema 118 with additional nodal trees or branches (update 153). The feed handler 146 can generate the update 153 in response to events or conditions. In one implementation, the feed handler 146 generates the update 153 based on schema state 141. In variations, feed handler 146 can respond to the user interface content 143. Various kinds of user interface content 143 can be used by the feed handler, such as, for example, the type of printer 10. As a specific example, a developer can generate script 139 to implement the feed handler 146 so that if the printer 10 10 is a black and white printer, the user interface content 143 causes the feed handler 146 to update 153 schema 118 with nodes for content retrieval that are optimized for grayscale.

Execution of the scripts 139 can result in script output 145, such as user interface input for an authentication screen etc. In this way, the developer can utilize scripts 139 to augment er configure functionality of an application implemented through system 100.

Methodology

Figure 2:
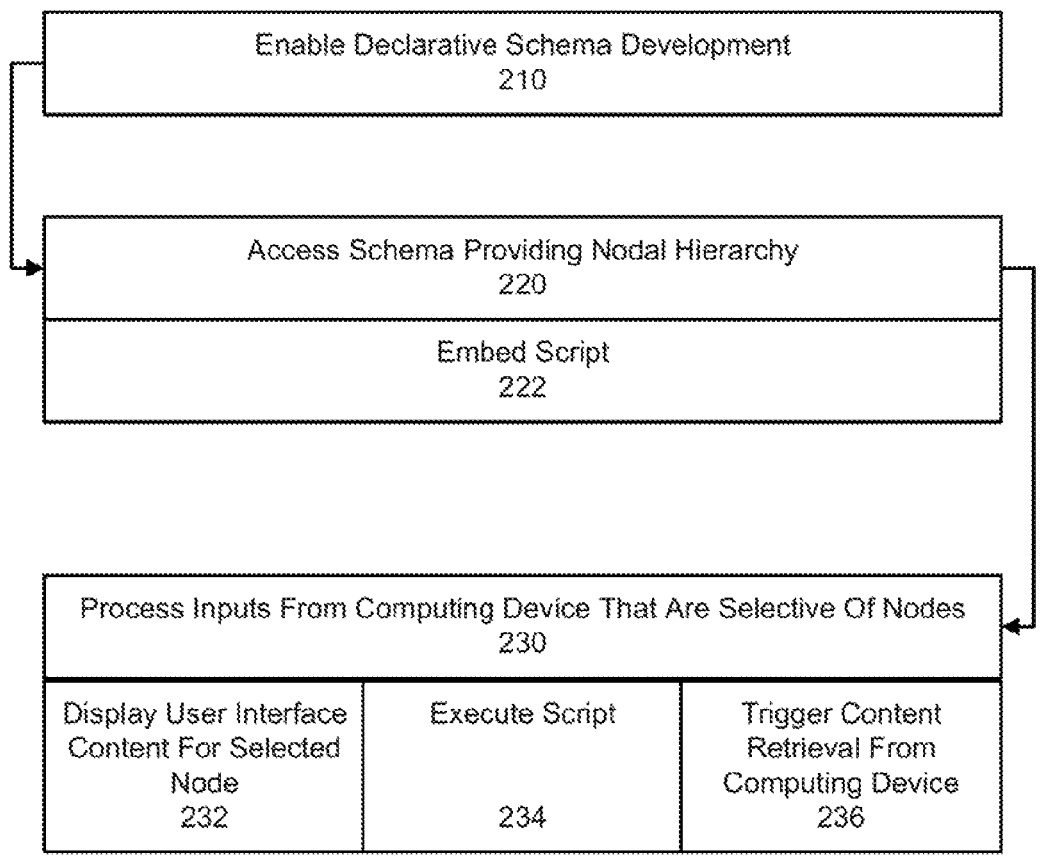
FIG. 2 illustrates an example method for remotely executing an application that is utilized by an end user on a computing device.

FIG. 2 illustrates an example method for remotely executing operations of an application that is utilized by an end user on a computing device. A method such as described by an example of FIG. 2 can be implemented using a system such as described with an example of FIG. 1. Accordingly, reference may be made to elements of FIG. 1 for purpose of illustrating suitable components or functionality for performing a step or sub step being described.

With reference to FIG. 2, a developer can be provided a functional interface to develop a schema 118 (210) using primarily declarative language input. The use of declarative language, in combination with a hierarchal node structure, as described with schema 118, enables relatively unskilled programmers to create and configure applications. As further described with an example of FIG. 1, developers can further use the declarative language and schema to implement scripts 139 to provide extensibility and customization of specific desired functionality. An individual schema 118 can be stored in connection with an application that a user may select.

During runtime, the schema 118 can be accessed (220). The system 100, for example, can implement the schema 118 to coordinate and specify various network-side operations that are individually responsive to user input. In one implementation, the script 139 can be embedded, or otherwise integrated with the one or more developer-specified nodes of the nodal hierarchy (222). For example, the script can be implemented so that it is triggered in connection with user selection of specific nodes that comprise the schema 118.

In runtime, user input is processed that is selective of individual nodes that comprise the schema 118 (230). Various outcomes can result from processing input in context of schema 118. In particular, user input that corresponds to selection of a category node can result in the generation of user interface content that provides the end user the opportunity to select one or more other category nodes (232).

Still further, some nodes can be associated with scripts, resulting in execution of the script (234). For example, the script 139 can be linked for triggering in response to selection input received by multiple nodes of the schema 118. The execution of the script can result in the generation of user interface content, as well as output (e.g., authentication output) that is specific to functionality of the script.

Still further, some nodes (content consumption nodes) can specify sources (e.g., network address or URL, local file) where content for consumption is located. The content consumption node 135 can result in the system 100 communicating, for example, a link to the end user device (e.g., printer), causing the printer to access and locate a content site where content located by the communicated link is provided. In the case of a printer, the content consumption node 135 can, for example, identify or provide documents that are outputted by the printer as a result of execution of the application identified by the schema 118.

Example Schema Implementation

Figure 3A:
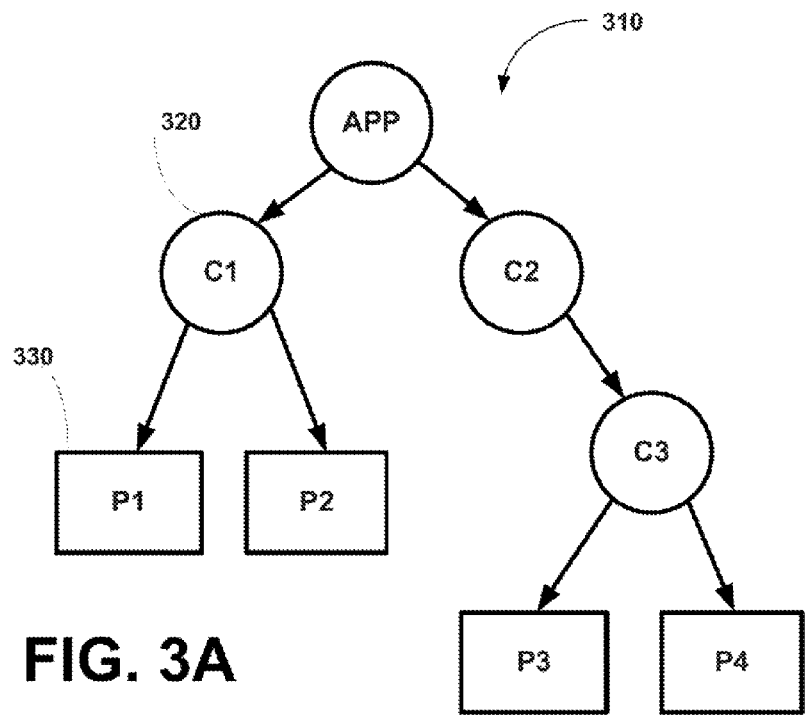
FIG. 3A illustrates an example schema that includes category nodes and content nodes, arranged in a logical hierarchy.

FIG. 3A illustrates an example schema that includes category nodes and content nodes, arranged in a logical hierarchy. With reference to FIG. 3A, a partial schema 310 is shown to include category nodes 320 and content consumption nodes 330. As described with previous examples, navigation of user input in the context of schema 310 can result in selection of category nodes, which generate user interface content displaying other nodes of the schema. Navigation of other user input can result in selection of content consumption nodes 330, resulting in the end user device consuming content from some source, such as a source corresponding to system 100, a source associated or affiliated with system 100, or a local source of the partial schema 310.

The following provides an example of schema 310, such as described with an example of FIG. 3A:

```
<AppBuilder>
    <category id="1">
        <category id="2">
            <printable id="3">
                <document paperSize="IsoA4_210x297mm"
                    id="String">
                <url plex="Duplex"
                    href="http://feedhost/test.jpg"
                    orientation="Landscape">
                </url>
                <previewImage
                    href="http://feedhost/prevw.jpg"
                    size="large" />
                </document>
            </printable>
        </category>
    </category>
<AppBuilder>
```

Figure 3B:
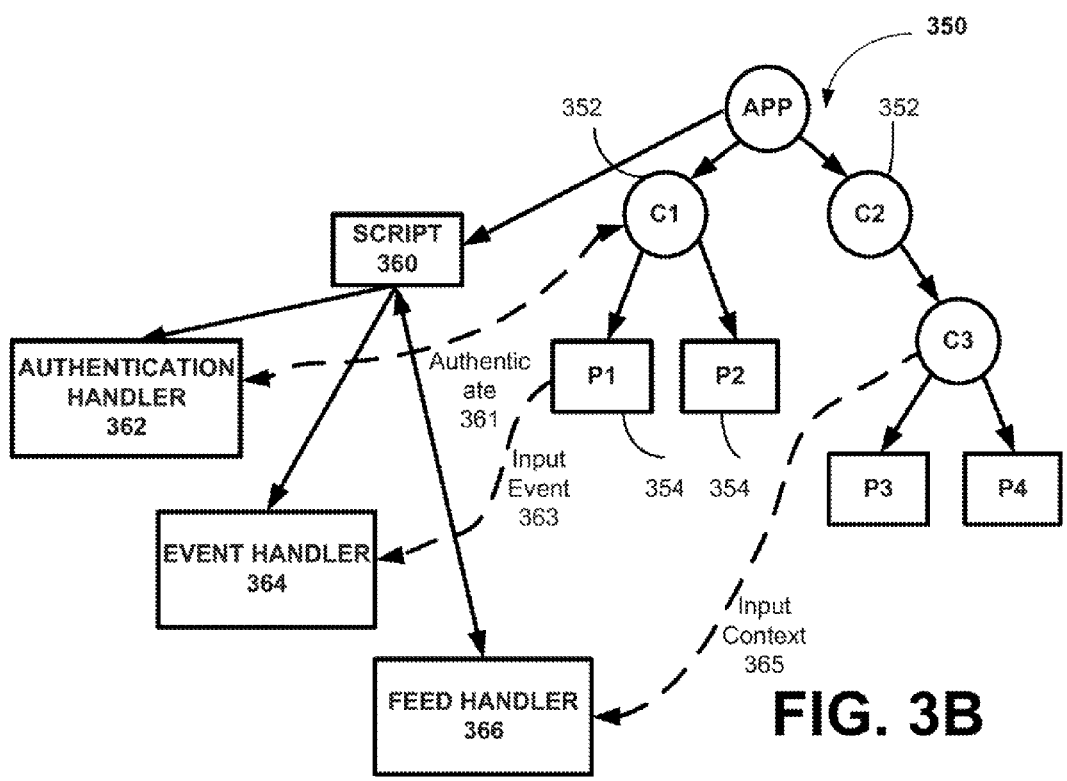
FIG. 3B illustrates an example schema in which a script is used to augment or customize functionality provided through the schema.

FIG. 3B illustrates an example schema 350 in which a script 360 is used to augment or customize functionality provided through the schema 118. As shown, the script 360 can include various script functionalities that can be embedded with multiple nodes of the schema 118. An example of a script semantic can include:

```
<AppBuilder>
    <script language="javascript" source="http://localhost/pnc-
    feed/minimal_basic_auth.js" />
</AppBuilder>
```

According to some examples, the script functionality can include authentication handler 362, event handler 364, and feed handler 366. The authentication handler 362 can, for example, perform an authentication operation 361 to authenticate a user (or user action) when a specific category node 352 or content consumption node is selected with the user input. In some implementations, the result of the authentication operation can correspond to user interface content that is specific for the authentication operation. The authentication handler 362 can perform custom authentication based on the instructions contained in the script 360. By way of example, the following script can implement an authentication handler, in accordance with examples described herein:

```
<function name="doCustomAuth">
<input type="text" id="id">Username</input>
<input type="password" id="pw">Password</input>
<failureMessage>Auth Failed</failureMessage>
</function>
```

The event handler 364 can be associated with, for example, one or more of the content consumption nodes 354, and/or one or more of the category nodes 352. The event handler 364 can provide one or more triggers for performing operations of the script 360. In this regard, the event handler can 364 respond to events 363 that occur with selection of content nodes or content consumption nodes 354. By way of example, the following script can implement the event handler 364, in accordance with examples described herein:

```
<category id="11" onClick="event:checkRegion( )">
<printable id="12"> ... </printable>
</category>
```

Still further, the feed handler 366 can be associated with one of the category nodes 352, and be responsive to some input content 365 to generate additional schema portions. By way of example, the following script can implement the feed handler 366, in accordance with examples described herein:

<category id="11" src="script:getSubTree( )"/>

In one implementation, the script 360 can be used to integrate different functional components with multiple nodes of the schema 350. In variations, multiple scripts can be implemented for the schema 350.

Hardware Diagram

Figure 4:
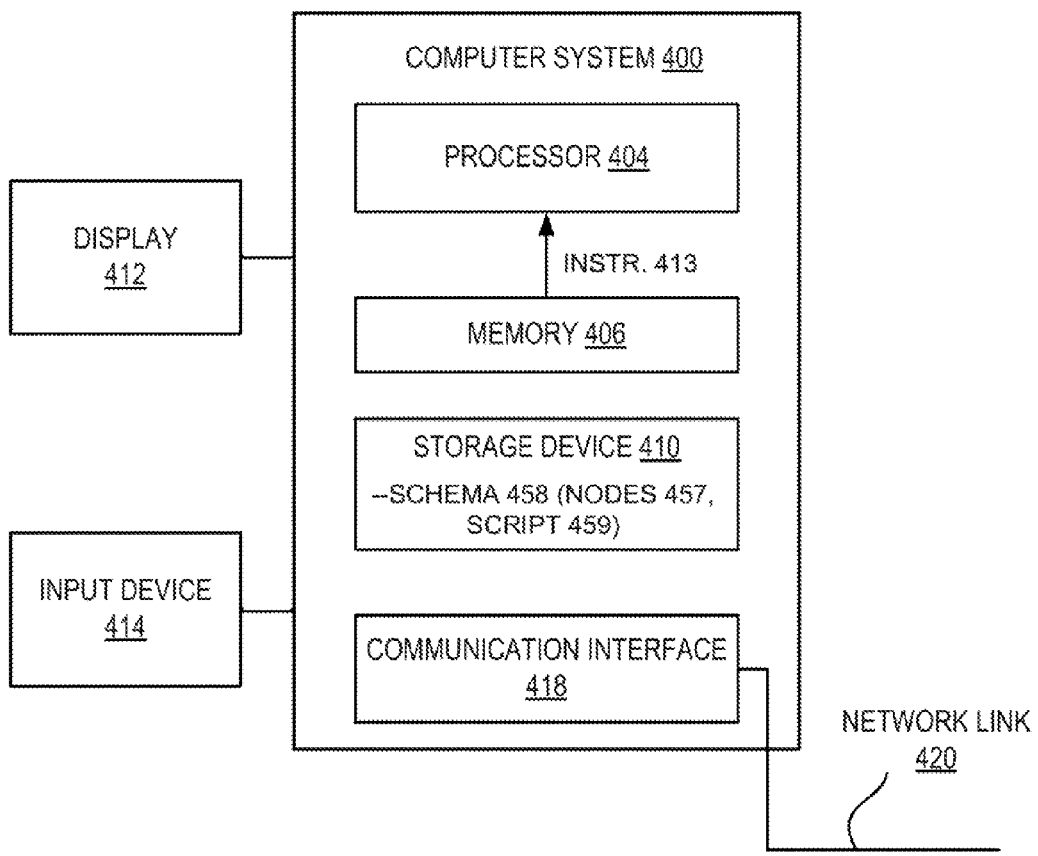
FIG. 4 illustrates an example hardware diagram for a computer system upon which examples described herein may be implemented.

FIG. 4 is a block diagram that illustrates a computer system upon which embodiments described herein may be implemented. For example, in the context of FIG. 1, system 100 may be implemented using a computing system such as described by FIG. 4.

In an embodiment, computer system 400 includes processor 404, main memory 406 (including non-transitory memory), storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420 (wireless or wireline).

In one example, the storage device 410 can store schemas 458 for different applications. Each schema can define a hierarchy of category nodes and content consumption nodes (collectively "nodes 457") and scripts 459. Other resources for implementing applications using the schemas 458, such as scripting function libraries, can also be stored with the storage device 410. The schemas 458 can be specified by, for example, developers, using a declarative language model. The memory 406 can store instructions 413 for implementing components of system 100, including associating script functionality with implementation of an application using a particular schema 458. The schema 458, when executed, can result in the implementation of other functionality, such as the authentication handler, event handler, or feed handler.

Computer system 400 can include display 412, such as a cathode ray tube (CRT), a LCD monitor, and a television set, for displaying information to a user. An input device 414 is coupled to computer system 400 for communicating information and command selections to processor 404. The input device 414 can correspond to, for example, a touch-screen or touch sensitive sensor. Other examples of input device 414 include a mouse, a trackball, or cursor direction keys for communicating direction information and command selections to processor 404 and for controlling cursor movement on display 412. While only one input device 414 is depicted in FIG. 4, embodiments may include any number of input devices 414 coupled to computer system 400.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A non-transitory computer-readable medium for remotely executing operations of an application that is provided through a computing device, the non-transitory computer-readable medium carrying instructions, that when executed by one or more processors, cause performance of operations comprising:
   (a) accessing a schema that logically represents a nodal hierarchy relating to execution of an application on a processing device, the nodal hierarchy including multiple nodes, including one or more category nodes and one or more content nodes;
   (b) providing, with the schema, an executable script that is associated with at least one node of the hierarchy;
   (c) processing, using the schema, a user input from the computing device, the user input being selective of one or more nodes of the hierarchy, and providing user interface content to the computing device, the user interface content corresponding to one of (i) one or more nodes, or (ii) a script content, generated as an output of an executed script that is associated with a selected node; and
   (d) executing, using the schema, the application on the processing device.

2. The non-transitory computer-readable medium of claim 1, wherein the executed script invokes an authentication functionality that is configured by a developer.

3. The non-transitory computer-readable medium of claim 1, wherein the executed script invokes an event handling functionality that specifies a type of input that can be recognized from a user in response to the user interface content being displayed on the computing device.

4. The non-transitory computer-readable medium of claim 1, further comprising instructions for identifying and integrating an additional set of nodes in the schema in response to a pre-determined condition or event.

5. The non-transitory computer-readable medium of claim 1, wherein the schema is generated from input by an application developer.

6. The non-transitory computer-readable medium of claim 5, wherein the input by the application developer is declarative input.

7. The non-transitory computer-readable medium of claim 1, further comprising executing the script in response to selection of the selected node by the user input.

8. The non-transitory computer-readable medium of claim 1, wherein (a) through (d) are performed in response to a user of the computing device selecting to execute the application.

9. The non-transitory computer-readable medium of claim 1, wherein (d) includes providing content corresponding to a content node on the computing device, the content node being selectable on the computing device to cause the computing device to access and act on a content through a content service.

10. A computer system comprising:
a memory resource that stores a set of instructions and a schema, the schema logically representing a nodal hierarchy relating to execution of an application that is operable on a computing device in communication with the computing system, the nodal hierarchy including multiple nodes, including one or more category nodes and one or more content nodes;
wherein at least one of the nodes of the nodal hierarchy includes an executable script; and
one or more processors that use instructions from the memory resource to:
access the schema in response to a selection from an operator of the computing device;
using the schema and in response to an input from the operator of the computing device, providing a series of user interface content to the computing device, each user interface content corresponding to one of (i) one or more nodes, or (ii) a script content, generated as an output of an executed script that is associated with a selected node; and
operate the application on the computing device using the schema.

11. The computer system of claim 10, wherein the executed script invokes an authentication functionality that is configured by a developer.

12. The computer system of claim 10, wherein the executed script invokes an event handling functionality that specifies a type of input that can be recognized from a user in response to the user interface content being displayed on the computing device.

13. The computer system of claim 10, further comprising instructions for identifying and integrating an additional set of nodes in the schema in response to a pre-determined condition or event.

14. The computer system of claim 10, wherein the computer system provides a network service that communicates with the computing device across the Internet.

15. A method for remotely providing application functionality to a printer, the method being implemented on one or more servers and comprising:
accessing a schema that logically represents a nodal hierarchy relating to execution of an application for the printer, the nodal hierarchy including multiple nodes, including one or more category nodes and one or more content nodes;
providing, with the schema, an executable script that is embedded in association with at least one node of the hierarchy;
processing, using the schema, each of multiple user inputs from the printer, the individual inputs being selective of nodes of the hierarchy;
in response to processing each of the multiple user inputs, providing a series of user interface content to the printer, each user interface content corresponding to one of (i) one or more nodes, or (ii) a script content, generated as an output of an executed script that is associated with a selected node; and
executing, using the schema, the application for the printer.

\* \* \* \* \*